(12) United States Patent
Kuhlke et al.

(10) Patent No.: US 8,626,133 B2
(45) Date of Patent: Jan. 7, 2014

(54) MATCHING A LOCATION OF A CONTACT WITH A TASK LOCATION

(75) Inventors: Matthew Kuhlke, San Francisco, CA (US); Yashas Prasad, San Jose, CA (US); Mithilesh Kumar, San Jose, CA (US); Lance Saleme, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 495 days.

(21) Appl. No.: 12/544,057

(22) Filed: Aug. 19, 2009

(65) Prior Publication Data

US 2011/0045841 A1 Feb. 24, 2011

(51) Int. Cl.
*H04M 3/42* (2006.01)
(52) U.S. Cl.
USPC ............... 455/414.1; 455/456.1; 455/456.3; 455/456.6
(58) Field of Classification Search
USPC ................ 455/414.1, 456.1, 456.3, 456.6
See application file for complete search history.

(56) References Cited

U.S. PATENT DOCUMENTS

| | | | |
|---|---|---|---|
| 6,317,718 B1 | 11/2001 | Fano | |
| 7,016,855 B2 | 3/2006 | Eaton et al. | |
| 2002/0068583 A1* | 6/2002 | Murray | 455/456 |
| 2004/0203847 A1 | 10/2004 | Knauerhase et al. | |
| 2005/0277409 A1* | 12/2005 | Etelapera | 455/418 |
| 2006/0058948 A1* | 3/2006 | Blass et al. | 701/207 |
| 2006/0061488 A1 | 3/2006 | Dunton | |
| 2008/0155547 A1* | 6/2008 | Weber et al. | 718/102 |
| 2008/0195312 A1* | 8/2008 | Aaron et al. | 701/209 |
| 2008/0235349 A1* | 9/2008 | Caspi et al. | 709/218 |
| 2010/0004005 A1* | 1/2010 | Pereira et al. | 455/457 |
| 2010/0311395 A1* | 12/2010 | Zheng et al. | 455/414.1 |

FOREIGN PATENT DOCUMENTS

| | | |
|---|---|---|
| EP | 1 441 300 A1 | 1/2004 |
| EP | 1 441 300 A1 | 7/2004 |

* cited by examiner

*Primary Examiner* — Charles Appiah
*Assistant Examiner* — Jaime Holliday
(74) *Attorney, Agent, or Firm* — Brinks Gilson & Lione (57) ABSTRACT

An alert system is provided. The alert system includes a processor and a memory coupled to the processor. The memory is computer-readable storage media configured to store instructions that are operable to be executed by the processor. The memory stores instructions that may be executed to determine a physical location of a contact in a contact list or a user managing the contact list; determine a physical location associated with a task in a task list; compare the physical location of the contact with the physical location associated with the task; determine when the physical location of the contact matches the physical location associated with the task; and transmit an alert message indicating the contact and the task.

20 Claims, 3 Drawing Sheets

MATCHING A LOCATION OF A CONTACT WITH A TASK LOCATION

FIELD OF TECHNOLOGY

The present embodiments relate to telecommunications. In particular, the present embodiments relate to sending an alert message when a location of a contact matches a task location associated with a task in a task list.

BACKGROUND

A user may manage a contact list and an electronic task list. The contact list may include the names, numbers, and/or addresses of one or more contacts. The task list may be used to remind the user of or list tasks that need to be completed. Tasks in the task list are performed or completed at a task location. A contact may be at or near the task location.

DETAILED DESCRIPTION

The present embodiments relate to determining when a physical location of a contact or user matches a task location associated with a task in a task list. An alert message may be transmitted to the contact when the physical location of the contact or user matches the task location. The physical location of the contact and user may be determined using a global positioning system (GPS) device, such as a cellular telephone. The alert message may be sent to the user and/or the contact. The alert message may be sent to the user as a reminder to complete a task. However, the alert message may be sent to the contact as a request, for example, to complete the task for the contact.

There are many advantages to transmitting an alert message based on a contact's location. One such advantage is that the user may have tasks completed even when the user is not physically present at the task location.

As used herein, the term "contact" includes a person, human-being, entity (e.g., company), or electronic device known to the user. The term "user" includes a human or electronic device owning, using, controlling, operating, or managing a task list, a contact list, or both the task list and contract list. Contact data, which identifies the contact, may be stored in the user's contact list.

In one aspect, an alert system is provided. The alert system includes a processor and a memory coupled to the processor. The memory is computer-readable storage media configured to store instructions that are operable to be executed by the processor. The memory stores instructions that may be executed to determine a physical location of a contact in a contact list or a user managing the contact list; determine a physical location associated with a task in a task list; compare the physical location of the contact with the physical location associated with the task; determine when the physical location of the contact matches the physical location associated with the task; and transmit an alert message indicating the task.

In another aspect, a method for sending an alert message is provided. The method includes determining a physical location of a contact in a contact list or a physical location of a user that manages the contact list. The physical location of the contact is compared with a physical location associated with a task in a task list. When the physical location of the contact matches the physical location associated with the task, an alert message is transmitted about the task.

In yet another aspect, an alert system is provided. The alert system includes a task manager, a contact manager, an environment having one or more establishments, and an alert device. The task manager may be configured to support a task list having one or more tasks and one or more task locations associated with the one or more tasks. The task list may be registered or managed by a user. The contact manager may be configured to support a contact list having a list of one or more contacts known to the user. The one or more contacts may be human-beings. The one or more establishments may be located at the one or more task locations. The alert device may be configured to compare physical locations of the one or more contacts or physical location of the user with the one or more task locations. The alert device may be configured to transmit an alert message when one of the one or more contacts is at or near one of the one or more task locations.

Figure 1:
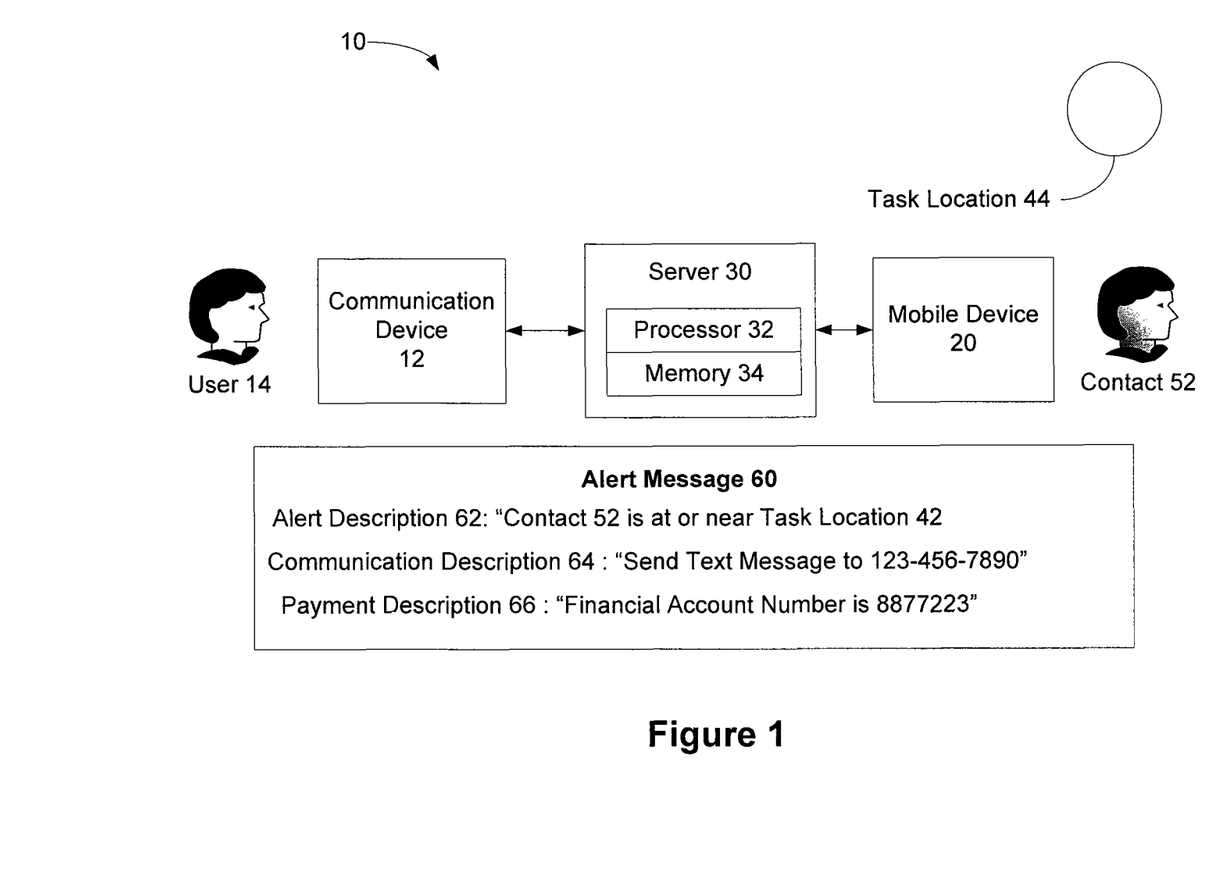
FIG. 1 illustrates one embodiment of an alert system and an alert message.

FIG. 1 shows an alert system 10. The alert system 10 may include one or more communication devices 12 (hereinafter, communication device 12), one or more mobile devices 20 (hereinafter, mobile device 20), and a server 30. The server 30 may be coupled with the communication device 12 and/or mobile device 20. As used herein, the term "coupled with" may include directly connected or indirectly connected through one or more intermediary components. The intermediary components may include software and/or hardware components. The connection may be a wireless connection, wired connection, or a series of wireless and/or wired connections.

The system 10 may be used to alert a user 14 and/or a contact 52 using an alert message 60. The server 30 may transmit the alert message 60 to the communication device 12 and/or mobile device 20 when the contact 52 and/or the user 14 is at or near a task location 44 for a task in a task list.

In one illustration of the alert system 10, John manages an electronic task list and a contact list. John creates a task in the electronic task list. The task is "buy shampoo." A task location, such as "convenience store," is associated with the task. John's roommate, Lance, goes into a convenience store to buy a pack of gum. Because Lance's contact data is stored in John's contact list, the alert system 10 may monitor Lance's physical location using Lance's global positioning system (GPS)-enabled telephone. Upon entering the convenience store, the alert system 10 may transmit an alert message 60 to Lance and/or John. The alert message may indicate that Lance is in a convenience store and can buy shampoo for John. The alert message may be used to initiate communication between Lance and John and/or request Lance to complete the task.

The communication device 12 may be operated by a user 14. The user 14 may be a human being, computer, automation system, or other device registered, authorized, permitted, or operable to control a task list and/or contact list. The mobile device 20 may be operated by a contact 52. As discussed above, a contact 52 is a person, human-being, or electronic device known to a user 14. The user 14 may know the contact 52 through family, friends, common acquaintances, colleagues, professional connections, social networks, or other networks, or the user 14 employs the contact 52, such as a personal assistant. In the illustration above, John is the user 14 and Lance is the contact 52.

The communication device 12 may be a personal computer, cellular telephone, mobile device, personal digital assistant, or other device operable to control a task list and/or contact list. In one example, the communication device 12 may be a global positioning system (GPS)-enabled mobile device. In another example, the communication device may be a combination of a personal computer and a mobile device that may sync together. The user 14 may view messages transmitted to the communication device 12. For example, a text message may be sent to and displayed on the communication device 12.

The communication device 12 may be used to manage an electronic task list (hereinafter, task list) 40.

Table 1 illustrates one example of a task list 40. The task list 40 may include a task 42, task location 44, due date 46, and alert policy 48. The task list 40 may include additional, different, or less information. A list of tasks 42 to be completed, such as chores, jobs, projects, meetings, gatherings, social tasks, employment tasks, or other tasks may be included. In the illustration above, "buy shampoo" is a task 42. In addition to the tasks defined in the task list 40, John may enter "buy shampoo" in the task list 40.

TABLE 1

Task List 40

| Task 42 | Task Location 44 | Due Date 46 | Alert Policy 48 |
|---|---|---|---|
| Pick up Groceries (banana and cereal) | Grocery Store | Thursday | Family |
| Pick up Prototype | Building Z | Friday | Colleague |
| Pick up dry cleaning | "Let us Clean It" | Saturday | Family |
| Cookout | 123 Oak St. | Sunday | Bill |

The task list 40 may be an electronic to-do list, time management list, or personal information manager. The task list 40 may be an electronic inventory tool which serves as an alternative or supplement to a memory of the user 14. The task list 40 may be used in self-management, business management, project management, and software development. One or more list may be included in the task list 40, or multiple, separate task lists may be used. For example, an employment task list may be combined with a social task list. Exemplary task lists include the "Tasks" feature in Microsoft Outlook™ sold by Microsoft Inc., the "Task List 5.2" application sold by Apple Inc., or other similar task list features.

In order to manage a task list 40, the communication device 12 may include an input. The input may be a keyboard, mouse, microphone, touch-screen, or other device for inputting information or instructions into the communication device 12. The user 14 may manage the task list 40 using the input. In another embodiment, the communication device 12 may automatically manage the task list 40 based on predetermined policies or user's past tendencies.

Managing the task list 40 may include adding, removing, or editing one or more entries in the task list 40. An entry may include a task 42, task location 44, due date 46, alert policy 48, a combination thereof, or other information in the task list 40. For example, a new task 42 may be added to the task list 40. In addition to adding the new task 42, the task location 44, due date 46 and alert policy 48 for the new task may be added to the task list 40 or modified. Additional, different, or less information may be added with the new task. In another example, once a task has been completed, the task 42 and associated information may be removed. Removing a task 42 may include checking a completion box or otherwise deleting the task 42.

The task location 44 may be a location where the task 42 may be completed. The task location 44 may be a general location (e.g., grocery store), specific location (e.g., Building Z, 123 Oak St.), or physical coordinates (e.g., longitude and latitude coordinates). The due date 46 may be a target due date, final due date, or actual date. For example, the due date 46 for picking up the dry cleaning may be a target due date if the clothes are not needed by Saturday. The due date 46 for picking up the dry cleaning may be a final due date if the clothes are needed for an event on Saturday evening. In another example, the due date 46 for the cookout may be an actual date. In other words, the cookout may be taking place on Sunday. The due date 46 may include a time, for example, 7:00 pm.

The alert policy 48 may be a contact (e.g., Bill) or contact group (e.g., Family, Colleague) that may be used for filtering alert messages 60 for a particular task 42. Contacts that are not defined in the alert policy 48 may not trigger an alert message 60 and/or may not receive an alert message 60. The alert policy 48 allows the user 14 to control alert messages 60. For example, the user 14 may use the alert policy 48 to prevent an alert message from being sent each time that a colleague enters a grocery store. The user 14 may know that it is unlikely that the colleague will be willing to "Pick up Groceries." The alert policy 48 may be set each time a task 42 is created. Alternatively, the alert policy 48 may be automatically set based on predetermined policies or past tendencies for a particular task 42. For example, the task "Pick up Dry Cleaning" may default to the contact group "Family." In an alternative embodiment, the alert policy 48 may be a predefined rule, such as "do not send an alert message between 8 am and 5 pm" or other user defined policy. Accordingly, the user 14 may tailor transmission of the alert message 60.

The communication device 12 may be used to manage a contact list 50.

Table 2 illustrates an exemplary contact list 50. The contact list 50 may include a contact 52, contact information 54, and contact group 56. Additional, different, or less information may be provided in the contact list 50. For example, each contact 52 may be associated with multiple communication devices and/or multiple contact groups 56. The contact list 50 may be an electronic collection of one or more contacts 52. A contact 52 may be a person or electronic device known to the user 14. The user 14 may desire to communicate with the contact 52. In order to do so, the user 14 may use the communication information 54. The communication information 54 may include a phone number, email address, text messaging address or number, video conferencing identification, a combination thereof, or other number or address for communicating with the contact 52. In one embodiment, the user 14 may be listed as a contact 52 in the contact list 50.

TABLE 2

Contact List 50

| Contact 52/Mobile Device 20 | Communication Information 54 | Contact Group 56 |
|---|---|---|
| Jane 52a/Cellular Phone 20a | 123-456-7890 | Family |
| Bill 52b/Auto. Nav. system 20b | bill@xxxx.yyy | Friend |
| John 52c/Cellular Phone 20c | 789-012-3456 | Colleague |

The user 14 may manage the task list 40 using an input of the communication device 12. Alternatively, or additionally, the communication device 12 may automatically manage the contact list 50 based on predetermined policies or the user's 14 past tendencies. For example, the communication device 12 may update the contact list 50 based on updates to an electronic social network, such as Facebook or MySpace. An updated phone number in an electronic social network may be reflected in the contact list 50.

The communication information 56 may be an address or number used to establish a communication connection with the mobile device 20 or a different device. For example, the phone number "123-456-7890" may be used to contact Jane's cellular telephone. However, the email address "bill@xxxx.yyy" may be used to send an email message to Bill's cellular telephone; not Bill's automotive navigation system.

The contact group 56 may define a group of contacts 52. The contact group may be defined based on the relation to the user 14. For example, members of the user's 14 family may belong to the contact group "Family." Friends of the user 14 may belong to the contact group "Friend." People that work with the user 14 may belong to the contact group "Colleague." Other contact groups 56 may be used.

The mobile device 20 may be a cellular telephone, personal digital assistant, media device, global positioning device (GPS), automotive navigation system, or other mobile device for which a physical location may be determined.

The mobile device 20 may be a GPS enabled mobile device. Exemplary mobile devices 20 include the iPhone™ made by Apple Inc., the HTC Fuze™ made by HTC Corporation, the Nüvi® 1250 navigation system made by Garmin Ltd., or other mobile devices with physical location enabled capabilities. As used herein, the term "physical location enabled capabilities" includes the ability to determine (e.g., locate) or provide information to assist in determining the physical location of the mobile device. The mobile device 20 may determine the physical location or another device may determine the physical location. In either case, the physical location of the mobile device may be determined. Non-GPS positioning may be used, such as relying on cell triangulation, entry of information (e.g., twittering a current location), or other manual or automatic input.

A contact 52 may use the mobile device 20. Using the mobile device 20 may include carrying the mobile device 20 (e.g., in the contact's 52 hand, bag, or car). As a result, a physical location of the mobile device 20 may represent (i.e., correspond with) a physical location of the contact 52. A mobile device 20 may be associated with a contact 52. For example, as shown in Table 2, the mobile device 20a may be associated with contact 52a, the mobile device 20b may be associated with contact 52b, and the mobile device 20c may be associated with contact 52c.

The server 30 may include a processor 32 and memory 34. Additional, different, or fewer components may be provided. The server 30 may be operable to continuously or periodically compare the location of one or more contacts 52 in a user's contact list 50 or the location of the user 14 with one, some, none, or all of the task locations 42 in a user's task list 40. The server 30 may be an alert device that is operable to send an alert message 60 when the location of one or more of the contacts or the location of the user approaches or matches the task location 42.

Figure 2:
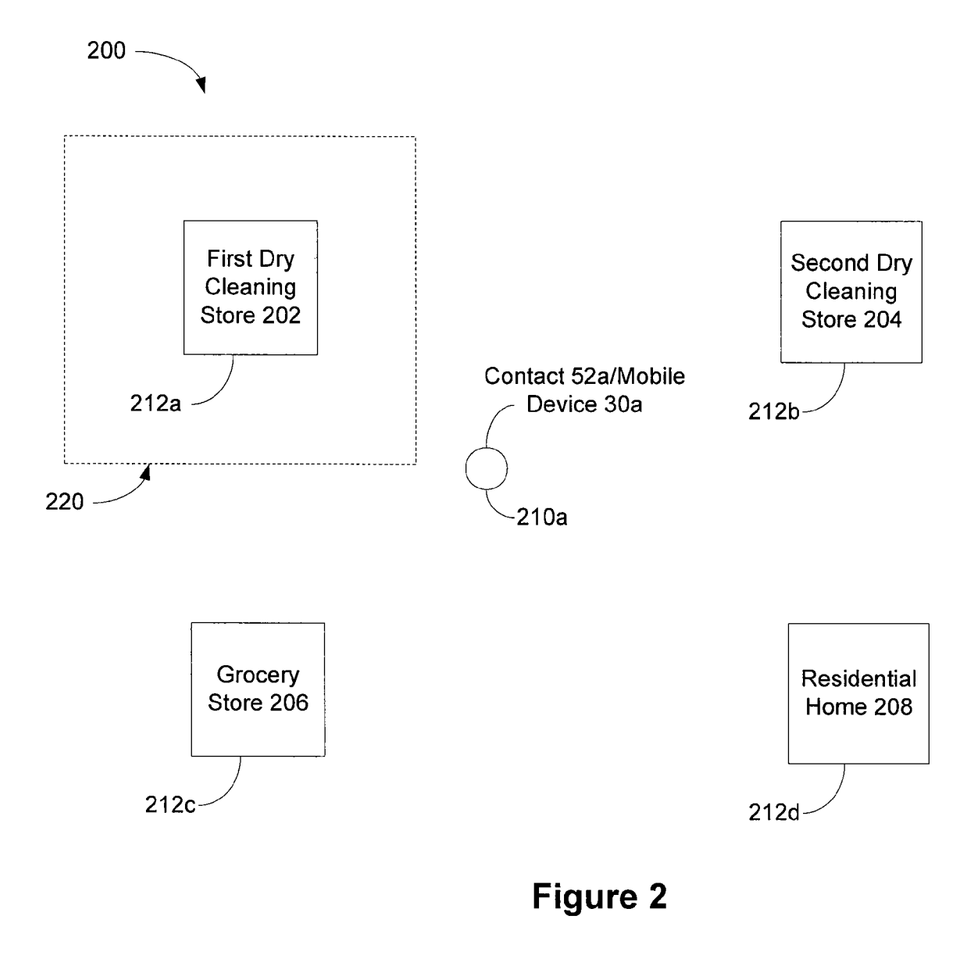
FIG. 2 illustrates one embodiment of an environment in which the alert system of FIG. 1 may be used.

FIG. 2 illustrates an environment 200 in which the alert system 10 of FIG. 1 may be used. Although FIG. 2 illustrates the environment 200 as a neighborhood, town, or city, in other embodiments, the alert system 10 may be used in a residential home environment, office building environment, commercial environment, nation-wide environment, and/or global environment. The size and shape of the environment 200 may or may not be restricted. For example, a corporation may restrict the environment 200 to buildings and/or streets used for business purposes.

As shown in the example of FIG. 2, the environment 200 may include one or more establishments, such as a first dry cleaning store 202, a second dry cleaning store 204, a grocery store 206, and a residential home 208. Additional, different, or fewer establishments may be provided in the environment 200. Any establishment may be used in the environment 200. As used herein, an establishment is a store, building, office, desk, address, or other space located at a task location 44. The establishment may provide a service or good to complete a task 42. The establishment may be associated with project locations, such as labs and offices.

The first dry cleaning store 202 may be named "Wash and Suds." The second dry cleaning store 204 may be named "Let us Clean It." The grocery store 206 may be named "Generic Grocery Store." The residential home 208 may be located at 123 Oak St.

The server 30 may determine a physical location 210 of one or more contacts 52, a physical location of the user 14, or a combination thereof. Determining the physical location may include calculating the physical location, receiving the physical location from another device or remote database, accessing the physical location from memory 34, or otherwise obtaining the physical location of the mobile device 20 associated with a contact 52 or a mobile device associated with the user 14. The physical location 210 may be a set of physical location coordinates. The set of physical location coordinates may include one or more GPS coordinates. The GPS coordinates may be longitude and latitude coordinates, such as "−87.6216148,41.8902682,0." In one example, the server 30 may determine a physical location 210a of mobile device 20b, a physical location 210b of mobile device 20b, and a physical location 210c of mobile device 20c.

The server 30 may determine a physical location 212 of one, some, or all of the establishments (e.g., task locations 42) in the environment 120. Determining the physical location 212 may include calculating the physical location 212, receiving the physical location 212 from another device or remote database, accessing the physical location 212 from memory 34, or otherwise obtaining the physical location 212 of the establishment. The physical location 212 may be a set of physical location coordinates. The set of physical location coordinates may include one or more GPS coordinates, such as longitude and latitude coordinates. Ranges of coordinates may be used. The location may be automatically mined, such as from the Internet, and/or input by the user 14.

The server 30 may continually or periodically compare the physical location 210 of a contact 52 and/or the physical location of the user 14 with the physical locations 212 of one, some, or all of the task locations 42 in the task list 40. Comparing may include comparing coordinates.

In one embodiment, the physical location 210 of the contact 52 is only compared to the physical locations 212 of the task locations 42 in the task list 40. For example, because the second dry cleaning store 204, the grocery store 206, and the residential home 208 are task locations 42, the physical location 210a of Jane 52a may be compared to the physical location 212b of the second dry cleaning store 204, the physical location 212c of the grocery store 126, and the physical location 212d of the residential home 208. The physical location 210a of Jane 52 may not be compared to the physical location 212a of the first dry cleaning store 202.

In another embodiment, the physical location 210 of the contact 52 is only compared to the physical locations 212 of the task locations 44 in the task list 40 of which an alert policy 48 matches the contact group 56 of the contact 52. For example, because Jane 52a is in contact group 56 and there is a "Family" alert policy 46 for "Picking up Groceries" and "Picking up Dry Cleaning," the physical location 210a of Jane 52a may be compared to the physical location 212b of the second dry cleaning store 204 and the physical location 212c of the grocery store 126.

In yet another embodiment, the physical location 210 of the contact 52 is compared to the physical locations 212 of all the establishments in the environment.

In an alternative embodiment, the location of the user 14 may be matched to the physical locations 212 of the task locations 44 in the task list 40. For example, the user 14 may receive an alert message 60 when the location of the user 14 matches the physical location 212 of a task location 44. One benefit of this embodiment is that the user 14 may be reminded to perform tasks 42. The chance of the user 14 forgetting to perform a task 42 is reduced. In one embodiment, the user 14 is listed as a contact 52. However, in other embodiments, the location of the user 14 is treated independently of those contacts 52 listed in the contact list 50. For example, the location of the user 14 may be continuously or periodically compared to one or more task locations 44.

The server 30 may make intelligent correlations between establishments. Correlations may be based on services or goods provided by the establishments, the establishment's capability to complete the task, or user's preference. For example, in one embodiment, if the user 14 recorded a task location as "Generic Grocery Store 206," the server 30 may compare the physical location 210 of a contact 52, such as Jane 52a, with the physical location of other grocery stores. The contact 52 may be able to complete the task 42 at a different establishment.

In another example, the server 30 may be an alert device that includes a natural language processing engine that is operable to cross-reference a task to determine establishments where the task may be completed. The server 30 may also be operable to compare the location of the contact to a physical location of the establishments where the task may be completed. In one example of cross-referencing, when the task "buy toilet paper" is entered in the task list, the server 30 may user the natural language processing engine to identify all, some, or none of the establishments in a database that sell toilet paper. The physical location of the establishments that sell toilet paper may be compared to the physical location of the contact or the physical location of the user.

In one embodiment, the server 30 may continually or periodically compare the physical location 210 of a contact 52 with a target zone 220 for a task location 44 in the task list 40. The target zone 220 may be a zone that is around, near, or associated with the physical location 212 of the task location 44. The target zone 220 may be one or more sets of coordinates that defines a zone. The target zone 220 may surround (e.g., three or more sets of coordinates) the physical location 212 of the task location 44, such as a block or local area. Alternatively, the target zone 220 may be line (e.g., two sets of coordinates), such as a street or store front. The target zone 220 may be used to indicate when a contact 52 is nearing the task location 44. The target zone 220 may be predefined or automatically set. For example, a target zone 220 may be automatically set to include five (5) square miles around the task location 44.

The server 30 may determine whether the physical location 210 of a contact 52 matches the physical location 212 of the task location 44 and/or the target zone 220. Matching may include being the same or almost the same. For example, the physical location 210a of Jane 52a may match the physical location 212b of the second dry cleaning store 204 when Jane enters into the second dry cleaning store 124 or pulls into a parking lot for the second dry cleaning store 204.

The server 30 may generate an alert message 60. The alert message 60 may be a text message, audio message, electronic mail message, video message, or other message that may be transmitted to the communication device 12 and/or mobile device 20. The alert message 60 may include an alert description 62, communication description 64, and a payment description 66. Additional, different, or less information may be provided. For example, the payment description 64 may not be included.

The server 30 may transmit the alert message 60 to communication device 12 and/or mobile device 20. Alternatively, or additionally, the alert message 60 may be posted to a social network service, such as Facebook, MySpace, or Linked-In. Other embodiments may include transmitting the alert message 60 to one or more devices or services operated, managed, owned, controlled, or viewed by the contact 52 or user 14.

The alert description 62 may describe the task 42, the task location 44, the user 14, and the contact 52. Additional, different, or less description may be provided. In one example, an alert description 62 may read "Jane is at Generic Grocery Store."

The communication description 64 may provide a communication address/number or access to a communication address/number for the contact 52. In one example, a communication description 64 may read: "Send Text Message to 123-456-7890." The phone number may include a hyper-link. Alternatively, the user 14 may look Jane up in the contact list 50, for example, by scrolling or searching.

The payment description 64 may provide payment options for completing the task 42. The payment options may include a financial account number, such as a PayPal account number or routing number/address, for providing monetary resources to the contact 52. For example, the server 30 may have access to Jane's financial account number, which may be her email address or bank account number. The payment description 64 may read: "Financial account number is 8877223." A one-time credit card number may be provided in the payment description 64. The payment description 64 provides a way for the user 14 to pay for the goods or services, or, alternatively, pay the contact 52 for completing the task.

The server 30 may transmit the alert message 60 to the communication device 12, mobile device 20, or both the communication device 12 and the mobile device 20. An alert message 60 transmitted to a mobile device 12 may be different than an alert message 60 transmitted to a communication device 12. For example, an alert message 60 transmitted to the mobile device 20 may read as follows: "You may be able to assist [insert User 14 name]. [User 14] is scheduled to [insert "Task 42"] from [insert "Task Location 46"]. Would you like to assist? If so, please contact User 14 at [insert user's communication number or address]."

The server 30 may transmit the alert message 60 when the physical location 210 of a contact 52 matches the physical location 212 of the task location 44 and/or the target zone 220. The alert message 60 may be transmitted to the communication device 12, mobile device 20, or other device. The user 14 may view the alert message 60 on the communication device 12. The contact 52 may view the alert message 60 on the mobile device 20. In an alternative embodiment, the user 14 may use the communication device 12, for example, a personal computer, to manage the task list 40 and contact list 50; however, the alert message 60 may be transmitted to the user's mobile device, for example, cellular telephone.

In an alternative embodiment, the alert message 60 is a reminder. When the user 14 arrives at a location for any purpose, the alert may reminder the user 14 of a task to be performed, at least in part, at the location.

In one embodiment, the server 30 may transmit the alert message 60 to only contacts 52 in the contact group defined in the alert policy 48. In order to do so, the server 30 may compare the alert policy 48 for the task 42 where the contact 52 is located to the contact group 56 to which the contact 52 belongs. If the alert policy 48 matches the contact group 56, the server 30 may transmit the alert message 60 to the contact 52. Otherwise, the server 30 may refrain from transmitting the alert message 60.

In another embodiment, the server 30 may transmit the alert message 60 on the actual due date. The server 30 may compare the due date 46 to the actual date. Accordingly, the server 30 may transmit the alert message 60 when the physical location 210 of the contact 52 matches the task location 44 and the due date 46 matches the actual date. For example, an alert message 60 may be transmitted to the user 12 when Bill 52c arrives at the residential home 208 on Sunday. Otherwise, for example, on Saturday, the server 30 may not transmit an alert message 60 if Bill 52c arrives at the residential home 208.

The processor 32 may be a general processor, digital signal processor, application specific integrated circuit, field programmable gate array, analog circuits, digital circuit, combinations thereof, or other now known or later developed processors. The processor 32 may be a single device or a combination of devices, such as associated with a network or distributed processing. Any of various processing strategies may be used, such as multi-processing, multi-tasking, parallel processing, or the like. Processing may be local, as opposed to remote. The processor 32 may be responsive to instructions stored as part of software, hardware, integrated circuits, firmware, micro-code or the like.

The memory 34 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 34 may be a single device or a combination of devices. The memory 34 may be adjacent to, part of, networked with, programmed with, and/or remote from the processor 32.

The memory 34 may store data representing instructions executable by the programmed processor 32. The processor 32 may be programmed with and execute the instructions. The functions, processes, acts, methods or tasks illustrated in the figures or described herein may be performed by the programmed processor executing the instructions stored in the memory. The functions, acts, processes, methods or tasks are independent of the particular type of instructions set, storage media, processor or processing strategy and may be performed by software, hardware, integrated circuits, firm ware, micro-code and the like, operating alone or in combination.

Figure 3:
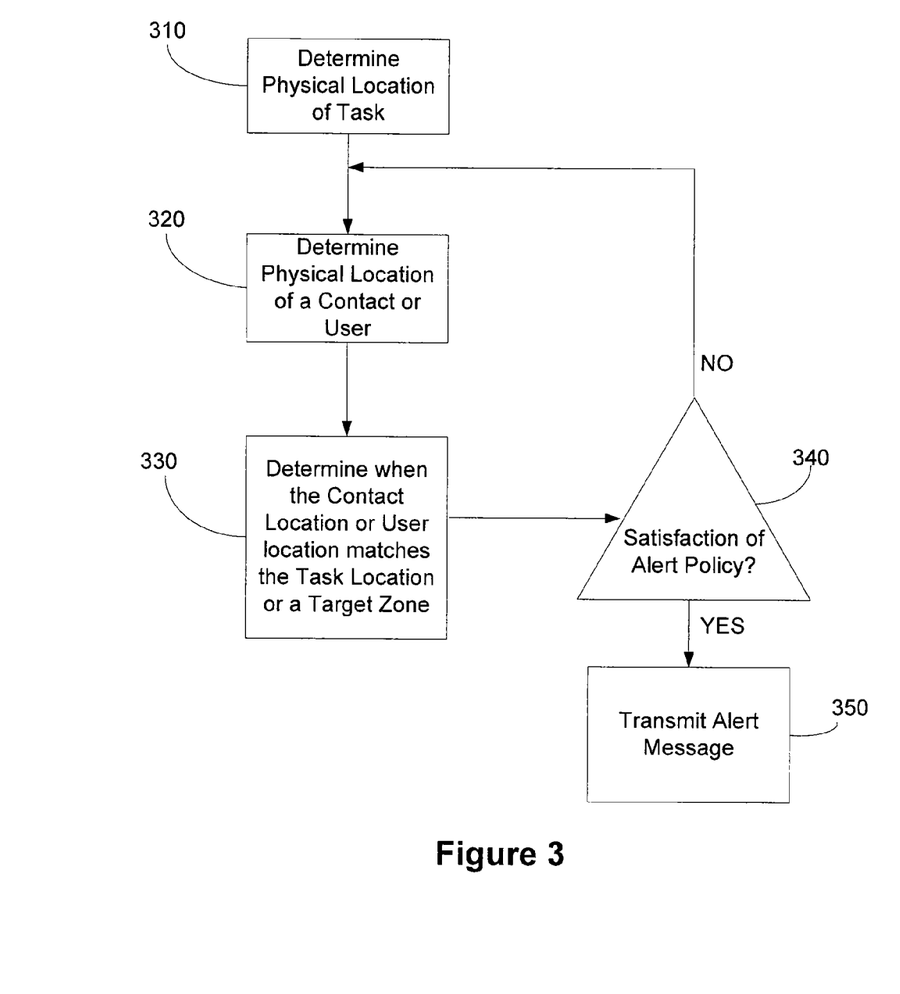
FIG. 3 illustrates one embodiment of a method for transmitting an alert message.

FIG. 3 illustrates a method 300 for sending an alert message. As shown in FIG. 3, the method 300 may include determining a physical location of a contact in a contact list 310 or a user; determining a physical location of a task in a task list 320; determining when the physical location of the contact or user matches with the physical location of the task 330; determining when an alert policy is satisfied 340; and transmitting an alert message indicating that the physical location of the contact matches the physical location of the task 350. Additional, different, or fewer acts may be provided. The acts may be performed in the order shown or a different order. The method 300 may be performed by the system 10 of FIG. 1 or a different system.

In act 310, an alert device may determine a physical location of a task in a user's task list. The physical location of the task may be a task location. In other words, the physical location of the task may a physical location where a task may be completed. For example, if the task is "pick up groceries" the task location may be "grocery store." The physical location of the task may be a set of coordinates, such as longitude and latitude coordinates. A database may store the physical location of the task. The alert device may access the database to determine the physical location. For example, a service or business creates the database of local establishments or business locations. Alternatively, the alert device may request the physical location from a remote device. For example, Google® maps is used to determine the locations of nearby grocery stores.

In act 320, the alert device may determine a physical location of a contact in a user's contact list or the physical location of the user. The physical location of the contact may be referred to as a contact location and the physical location of the user may be referred to as the user location. The contact location may be the contact's current location, for example, the location of the contact at any given time. The contact location may be determined by determining the physical location of a mobile device associated with the contact. For example, the mobile device may be registered to the contact. The mobile device may be a global positioning system (GPS)-enabled mobile device, such as a telephone, media player, or personal digital assistant. The alert device may directly determine the physical location of the contact or receive the physical location of the mobile device from a remote server or system, such as a system that is configured to determine a physical location of a GPS-enabled mobile device. The contact location may be continuously or periodically determined. The user location may be the user's current location, for example, the location of the contact at any given time. The user location may be determined in the same or similar manner that the contact location is determined.

In act 330, the alert device may determine when the contact location or user location matches the task location or a target zone for the task location. The contact location or user location may match the task location when the contact location or user location is at or near the task location. In the example above, the contact location may match the task location when the contact is at the grocery store. The contact location may also match the task location when the contact is near the grocery store, for example, in the parking lot. As used herein, the term "near" takes into account minor deviations during the comparison. For example, the term "near" takes into account that the contact location may not exactly match the task location even though the contact may be at the task location (e.g., a 10 meter or other tolerance due to GPS accuracy).

In one embodiment, the alert device may define a target zone around, adjacent to, above, or below the task location. The target zone may be used to indicate that the contact is near the task location. For example, a target zone may be defined around the neighborhood in which the grocery store is located. Accordingly, the alert device may determine when the contact enters into, crosses, or approaches the target zone.

In act 340, the alert device may determine whether an alert policy is satisfied. Determining whether an alert policy is satisfied may include comparing an alert policy group with a contact group associated with the contact whose location matches the task location or a target zone. The user may assign a contact group to the contact in the contact list. The user may also assign an alert policy group to a task. The alert device may compare the alert policy group with the contact group assigned to the contact. The alert policy may be satisfied when the alert policy group matches, includes, or is the contact group.

In act 350, the alert device may transmit an alert message. The alert message may be transmitted when the contact location matches the task location or a target zone. Alternatively, or additionally, the alert message may be transmitted when the alert policy is satisfied. For example, in one embodiment, the contact location must match the task location or target zone and the alert policy must be satisfied before an alert message is transmitted. The likelihood of the contact assisting the user is increased. In other embodiments, the alert message may be transmitted when the contact location matches the task location or a target zone. The alert message may be a text message (e.g., an electronic mail message or short message service message), audio message (e.g., a voice mail message), graphical message (multimedia messaging service message), or other type of message.

Various embodiments described herein can be used alone or in combination with one another. The detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. An alert system, comprising:
    a processor; and
    a memory coupled to the processor, the memory being configured to store instructions, the memory storing instructions that are executed by the processor to:
        determine a physical location of a first user device, wherein the first user device is associated with a contact in a contact list of a second user device;
        determine a physical location associated with a task in a task list, wherein the task is initiated by the second user device;
        compare the physical location of the first user device with the physical location associated with the task;
        determine the physical location of the first user device matches the physical location associated with the task;
        in response to determination of the match:
            transmit an alert message indicating the task and an identity of the contact to a social network accessed by the second user device, the alert message being posted in the social network for display by the second user device,
            wherein the alert message comprises contact information for contact of the first user device, the contact information being displayed by the second user device upon access of the social network.

2. The alert system of claim 1, wherein the first user mobile device is a global positioning system (GPS)-enabled cellular telephone.

3. The alert system of claim 1, wherein the memory further including stored instructions executed by the processor to look up the physical location associated with the task in a physical location database configured to store location coordinates.

4. The alert system of claim 1, wherein the physical location of the first user device matches the physical location associated with the task when the physical location of the contact is at or near the physical location of the task.

5. The alert system of claim 1, wherein the physical location of the first user device matches the physical location associated with the task when the physical location of the first user device is at a predefined target zone associated with the physical location associated with the task, the target zone being defined to indicate that the contact is near the physical location associated with the task.

6. The alert system of claim 1, wherein the alert message includes a link to provide payment for completion of the task.

7. The alert system of claim 1, wherein the alert message comprises a first alert message, and wherein the memory further includes stored instructions executed by the processor to:
    transmit a second alert message indicating the task to the first user device.

8. The alert system of claim 1, wherein the contact information comprises at least one of a communication address or a communication number, and wherein the alert message provides access to the communication address or the communication number.

9. The alert system of claim 1, wherein the contact information is configured in the alert message as a hyper-link.

10. A method for sending an alert message, the method comprising:
    determining, with a processor, a physical location of a contact in a contact list of a user, the contact included in the contact list based on information from a social network used by the user;
    determining, with the processor, a date range of a task in a task list of the user;
    comparing, with the processor, the physical location of the contact with a physical location associated with the task in the task list;
    determining, with the processor, when, during the date range, the physical location of the contact from the social network substantially matches the physical location associated with the task; and
    transmitting, with the processor, an alert message about the task to the social network when, during the date range, the physical location of the contact matches the physical location associated with the task,
    wherein the alert message transmitted to the social network is configured to be posted in the social network for a view by the user, and wherein the alert message comprises contact information of the contact for the user to identify upon view of the alert message posted in the social network.

11. The method of claim 10, wherein the physical location of the contact is a set of longitude and latitude coordinates.

12. The method of claim 10, wherein determining when the physical location of the contact matches the physical location of the task includes determining when the physical location of the contact is at or near the physical location of the task location.

13. The method of claim 10, wherein determining when the physical location of the contact matches the physical location of the task includes determining when the physical location of the contact is at or near a target zone assigned to the physical location of the task location, the target zone indicating when the contact is near the physical location of the task location.

14. The method of claim 10, wherein the alert message indicates that the user has a task to be completed at the physical location of the task.

15. The method of claim 10, wherein the alert message includes a link to provide payment for completion of the task.

16. An alert system comprising:
a task manager configured to support a task list having one or more tasks and one or more task locations associated with the one or more tasks, the task list being registered to a user;
a contact manager configured to support a contact list having a list of one or more contacts of the user, the one or more contacts associated with one or more contact devices; and
an alert device configured to:
compare physical locations of the one or more contact devices with a task location of the one or more task locations;
transmit an alert message to a social network used by the user when the one or more contact devices are at or near the task location,
wherein the alert message transmitted to the social network is configured to be posted in the social network for a view by the user, and wherein the alert message comprises contact information of the one or more contact devices for the user to identify when the alert message is posted in the social network.

17. The alert system of claim 16, where the alert message is transmitted when an alert policy is satisfied, the alert policy indicating that the contact satisfies an alert message policy.

18. The alert system of claim 16, wherein the alert message comprises a first alert message, and wherein the alert device is further configured to:
transmit a second alert message to the contact, the alert message indicating that the contact is located at or near a task location of the one or more task locations and a task to be completed, the task being associated with the task location.

19. The alert system of claim 16, wherein the alert device includes a natural language processing engine that is operable to cross-reference a task to determine establishments where a task is completed and operable to compare the location of the contact to a physical location of the establishments where the task is completed.

20. The alert system of claim 16, wherein the alert message comprises a first alert message, and wherein the alert device is further configured to transmit a second alert message to the one or more contact devices when the one or more contact devices are at or near the first task location.

* * * * *